April 17, 1956   J. J. FRANKLIN   2,742,143
APPARATUS FOR HANDLING MATERIALS IN STRAND OR ROPE FORM
Filed Aug. 17, 1953   4 Sheets-Sheet 2
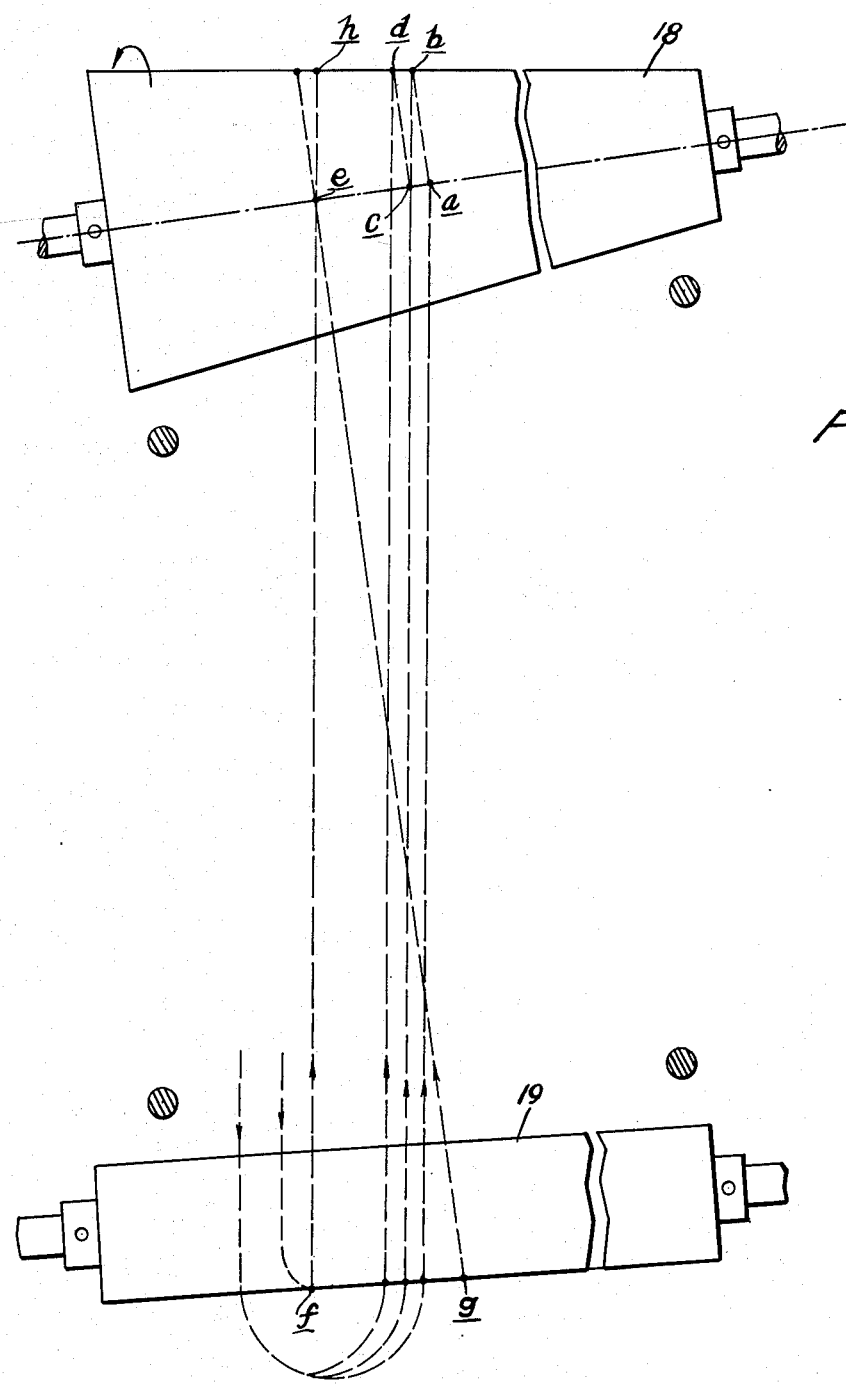
FIG. 2ᵃ.
INVENTOR
JOHN J. FRANKLIN
BY HIS ATTORNEYS
Howson & Howson

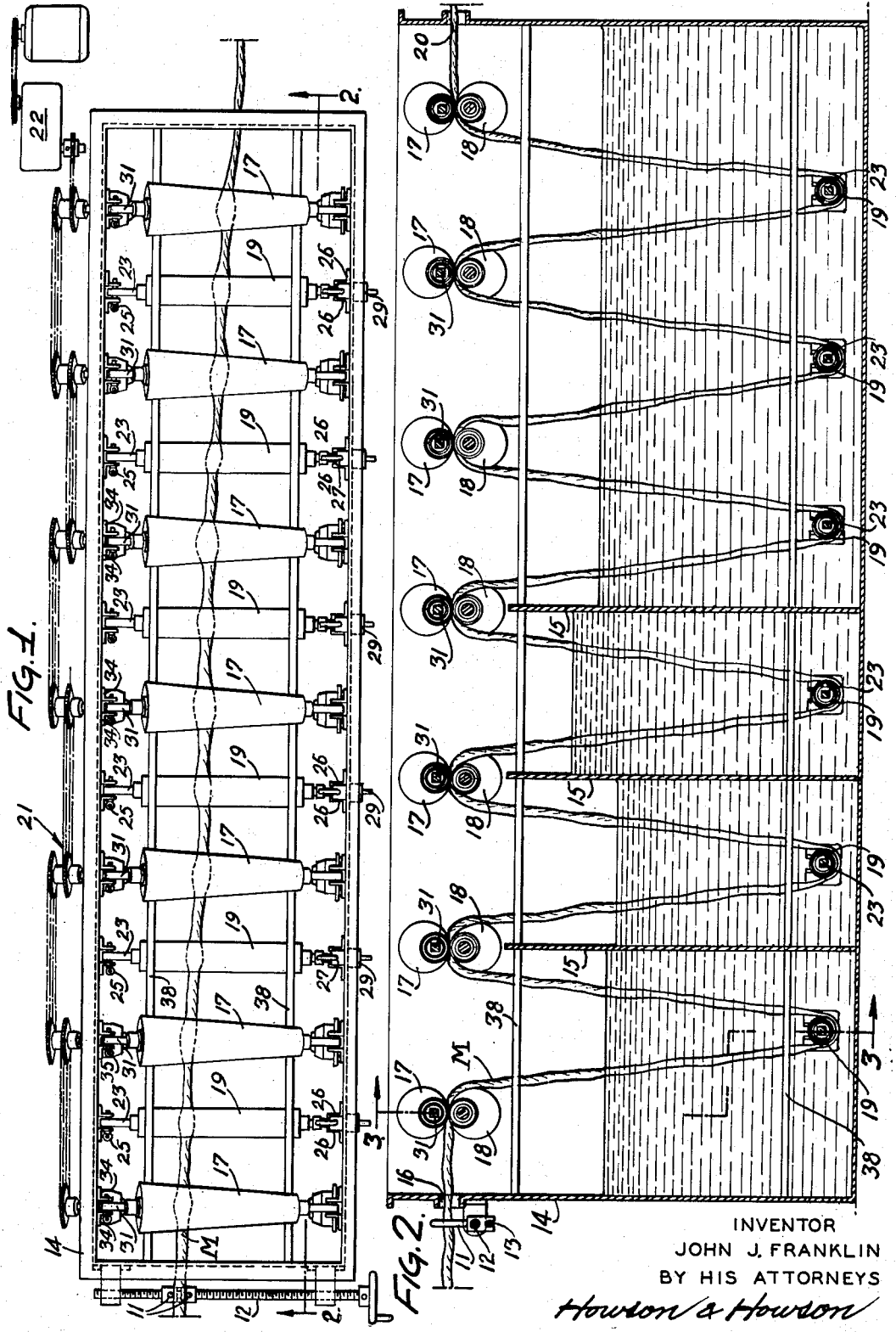

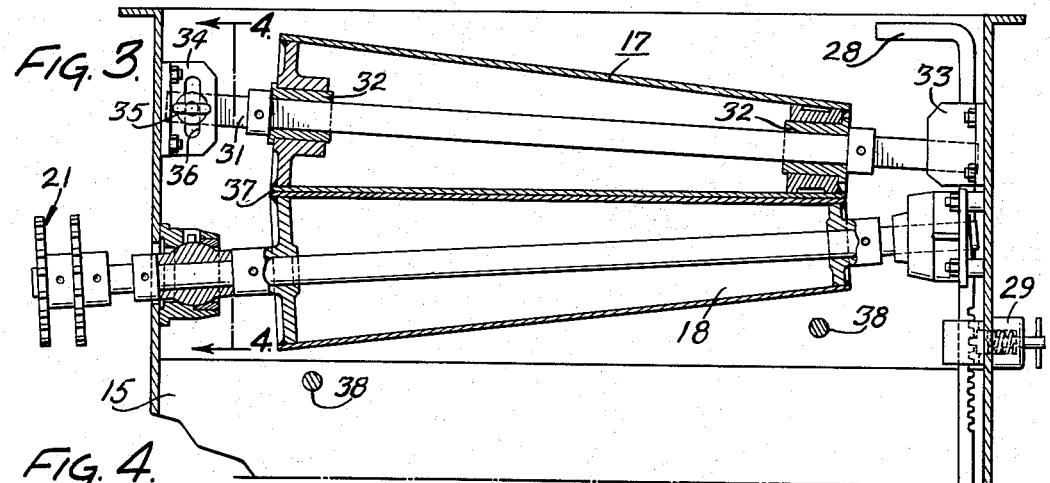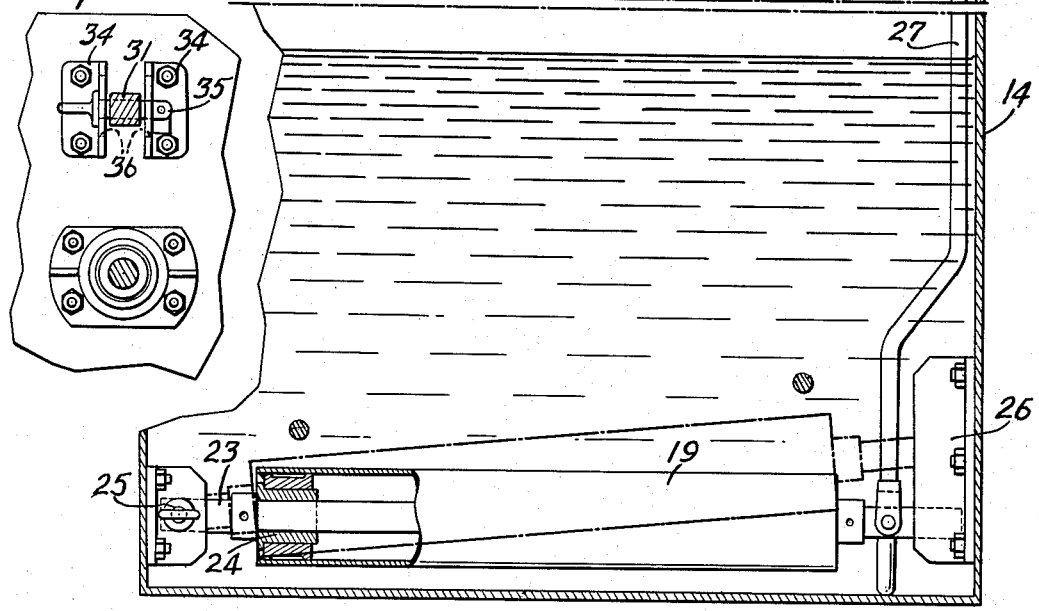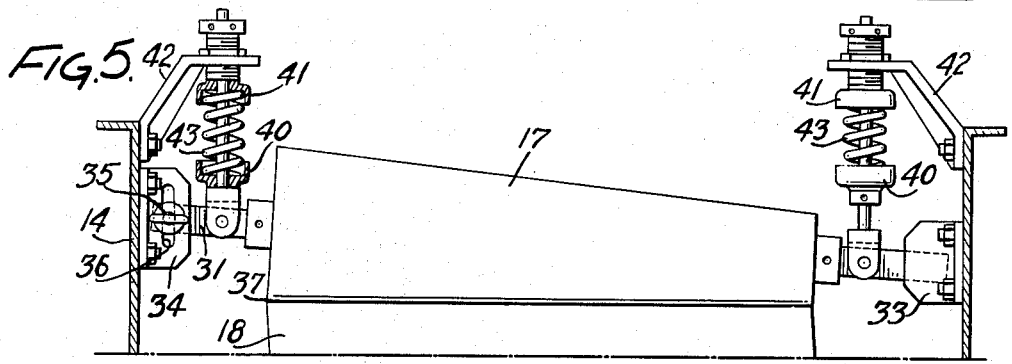

April 17, 1956   J. J. FRANKLIN   2,742,143
APPARATUS FOR HANDLING MATERIALS IN STRAND OR ROPE FORM
Filed Aug. 17, 1953   4 Sheets-Sheet 4
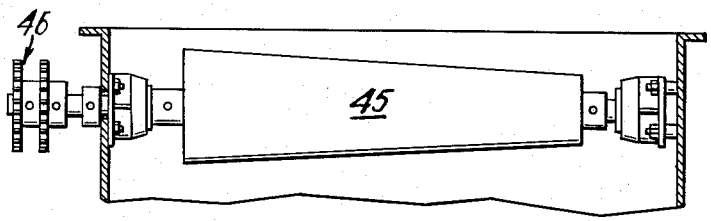
FIG. 6.
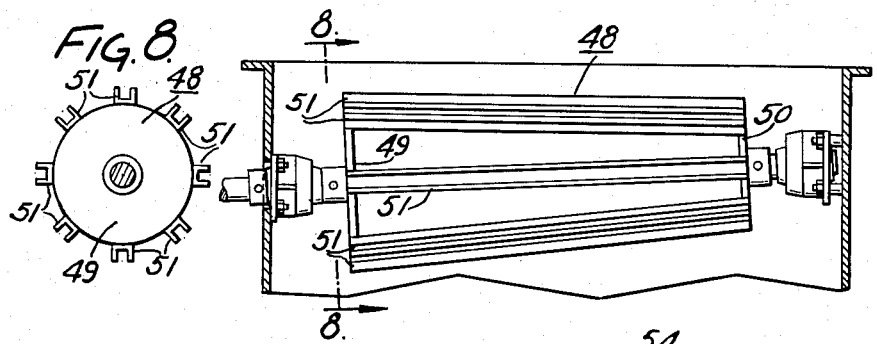
FIG. 8.
FIG. 7.
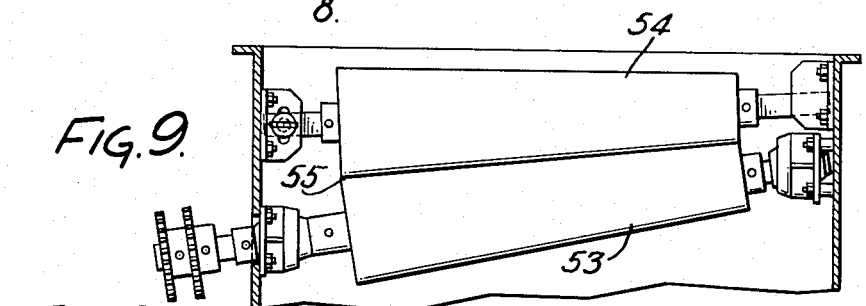
FIG. 9.
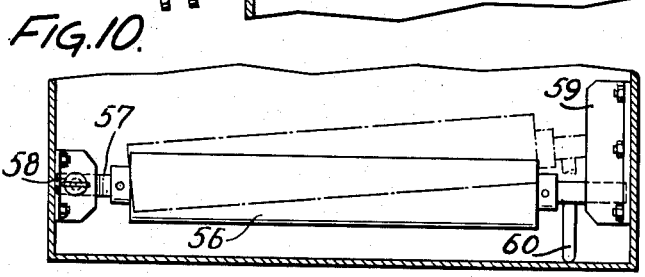
FIG. 10.
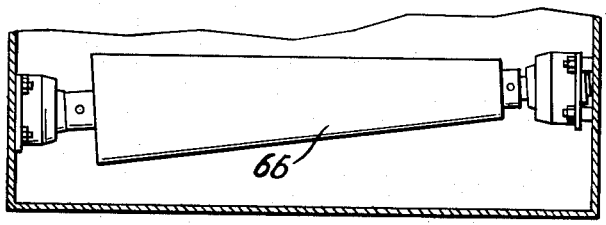
FIG. 11.
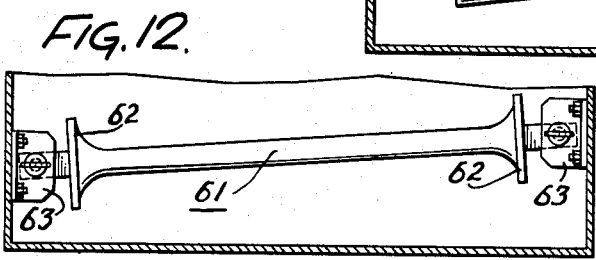
FIG. 12.
INVENTOR
JOHN J. FRANKLIN
BY HIS ATTORNEYS
Howson & Howson United States Patent Office 2,742,143
Patented Apr. 17, 1956

2,742,143

APPARATUS FOR HANDLING MATERIALS IN STRAND OR ROPE FORM

John J. Franklin, Glenside, Pa., assignor to Proctor & Schwartz, Inc., Philadelphia, Pa., a corporation of Pennsylvania Application August 17, 1953, Serial No. 374,784

13 Claims. (Cl. 203—240)

The present invention relates to handling apparatus for material in strand or rope form, and has special application to apparatus in which the material is handled under substantially constant tension.

In processing materials in strand, or rope form, it is frequently necessary to maintain the material under a constant tension. Especially when handling textiles, the shrinkage or stretch of the material requires that special compensating apparatus be provided in order to maintain the desired degree of tension.

A prior method of compensating for shrinkage and stretch of the material has been to change the speed of the handling rolls in accordance with the tension or slack existing in the material. The change in speed is effected automatically by feeler guides and the like, or manually under the supervision of the operator of the machine. In either event, the apparatus is expensive, and the change in handling speed lags behind the build-up of tension or slack which results in non-uniform treatment of the material.

Another method for maintaining constant tension on the material consists of looping the material into a series of sections and delivering it from each section by a pair of positively driven rolls. Compensating apparatus is provided for each pair of rolls to determine the slack or shrink in the material and regulate the handling rate of the rolls. The compensating apparatus is very expensive and is highly susceptible to mechanical failure.

In another conventional machine, there is a positive feed at only the delivery end of the machine, and the material is free to slide over the intermediate positively driven rolls. In apparatus of this character, it is impossible to provide a squeeze on the material as it passes over the intermediate driven rolls, and as a result, the treatment of the material is less effective than when it is squeezed upon each pass of the material over a driven roll.

With the foregoing in mind, a primary object of the present invention is to provide novel handling apparatus comprising constant speed rolls which automatically compensate for shrinkage and stretch of the material being handled.

Another object of the present invention is to provide handling apparatus of the character set forth in which the tension in the material is regulatable by simple mechanical adjustment.

A further object of the present invention is to provide handling apparatus in which the material passes between squeeze rolls in which the handling speed automatically compensates for shrink and stretch of the material.

Still another object of the present invention is to provide handling apparatus having the features and characteristics set forth which is of relatively simplified construction, and is entirely efficient and effective in operation and use.

These and other objects of the invention and the various features and details of the construction and operation thereof are more fully set forth hereinafter with reference to the accompanying drawings in which:

Figure 1 is a plan view of a washer embodying handling apparatus made in accordance with the present invention;

Fig. 2 is a vertical sectional view taken on the line 2—2 of Fig. 1;

Fig. 2a is an end elevation illustrating schematically the operation of the upper and lower rolls of the present invention;

Fig. 3 is an enlarged transverse sectional view taken on the line 3—3 of Fig. 2;

Fig. 4 is a sectional view taken on the line 4—4 of Fig. 3;

Fig. 5 is a fragmentary sectional view showing a modified form of the invention wherein a spring bias is provided on the upper squeeze roll;

Fig. 6 is a modified form of the invention wherein a single upper handling roll is employed;

Fig. 7 is a further modification wherein the upper roll is in the form of a slatted reel;

Fig. 8 is a sectional view on the line 8—8 of Fig. 7;

Fig. 9 discloses a further modification of the upper rolls made in accordance with the present invention; and, Figs. 10 to 12 are views of modified forms of lower rolls made in accordance with the present invention.

The invention contemplates apparatus in which the material is threaded in zig-zag runs between upper and lower series or rolls. The upper rolls are driven and control the handling speed whereas the lower rolls are idle, serving only to regulate the tension in the material and insure effective compensation for shrinkage and elongation of the material. In accordance with the invention, the driven rolls are tapered whereby the surface speed of the roll is greater at the large end of the roll than at the small end. The material is looped over each driven roll and automatically finds a location along the surface thereof which effects handling of the material at the proper speed to maintain the tension at the desired level. The novel arrangement of rolls disclosed herein is applicable to any type of strand material; however, for purposes of description, the invention will be described in connection with apparatus for handling continuous lengths of textile materials in strand or rope form.

Referring now to the drawings and more particularly to the embodiment shown in Figs. 1 to 4 thereof, the invention is shown as applied to a washer.

As seen in Figs. 1 and 2, the material M passes through an elongated tank 14. The tank is partitioned as indicated at 15 to provide a plurality of liquid baths for treating the material. The material enters the tank through a slot 16 which extends across the full width of the tank, and passes between the first pair of a series of cooperating upper and lower tapered squeeze rolls 17 and 18 respectively. The material then loops under the first of a series of bottom restraining rolls 19, each of which serves to maintain the material immersed in the bath and regulate the tension in the material, as described more fully hereinafter. The material is then looped alternately over the lower squeeze rolls 18 and under the restraining rolls 19, and is withdrawn through a slot 20 at the right hand end of the tank. The material is fed through the tank by the lower squeeze rolls 18 which are driven at the same constant speed by drive mechanism indicated generally at 21.

In accordance with the invention, the rolls 18 automatically compensate for the shrinkage or stretching of the material in the liquid baths. The rolls 18 are tapered as shown and by means of this construction, the handling speed at the large end of the rolls is substantially greater than at the small end thereof. Each loop of the material M finds a location along the roll 18 where the surface speed is such as to maintain the material under a given constant tension. If the material stretches, the handling speed must increase to compensate for it, and to accomplish this, the loop of material will travel automatically toward the large end of the tapered rolls. On the other hand, if the material shrinks, the handling speed must decrease and the loop of material will travel automatically toward the small end of the roll. As shown in Figs. 1 to 3, limit rods 38 are provided at each side of the tank to prevent the material from running off the rolls and fouling in the supporting structures. Thus, the invention provides means for automatically compensating the handling speed in accordance with the shrinkage or stretch in the material.

The material is looped under the restraining rolls 19 which are disposed adjacent the bottom of the tank 14 in spaced relation to the tapered rolls 18. Each restraining roll is mounted for rotation on a shaft 23 by means of plain bearings 24 at opposite ends of the roll. In order to regulate the tension in the material between rolls 18 and 19, the shaft 23 is mounted for angular adjustment relative to the roll 18. With the restraining roll 19 generally horizontal, as illustrated in full lines in Fig. 3, the tension is relatively high and when the roll is inclined as indicated in broken lines, the tension becomes relatively low or slack. If the material becomes slack, the loop automatically moves to the large end of the tapered roll to increase the handling speed and tension. If the material has excessive tension, the loop automatically moves to the small end where the handling speed and the tension are reduced to the desired level. Tilting the bottom roll, as indicated in broken lines, increases the tendency of the loop of material to travel to the right, i. e., towards the smaller end of the roll, and therefore reduces the tension in the material. On the other hand, reducing the angle of inclination of the lower roll increases tendency for the loop of material to move to the left, and causes a greater tension in the material. Thus, by simple adjustment of the shaft 23, it is possible to regulate the tension in the material to any desired degree.

The principle of operation of the invention is illustrated schematically in Fig. 2a of the drawings. Referring to Fig. 2a, when the material is slack, it approaches the upper tapered roll 18 in a vertical plane and contacts the roll 18 at point $a$ located on a horizontal line passing through the center line of the roll. Due to the taper and inclination of the shaft of this roll, the material is carried by the surface of the roll toward the large end of the roll along line $a, b$ to the point $b$. When the material has moved to point $b$, the point of initial contact of the material with the roll 18 will have moved from point $a$ to the point $c$ from which the material will be carried by the roll along the path $c, d$ to the point $d$. Thus, it will be apparent that as the roll 18 continues to rotate, the point of contact of the material with the roll progressively approaches the large end of the roll and, due to the increasing diameter of the roll, the speed of the rope is increased until slack is removed from the material as indicated, for example, at point $e$.

When slack has been removed as described, the material will then be in contact with the undersurface of the lower roll 19 at point $f$ thereby creating some slight tension in the material. Under these conditions, if the axis of the roll 19 is inclined, the material will immediately move in the opposite direction (to the right) along the roll 19 to relieve the tension. As the material moves toward point $g$ on the lower roll 19, movement of the material toward the large end of the upper roll 18 ceases. At the same time, the slight tension causes the material to follow the shortest path in contact with the tapered roll 18. The shortest path is shown by the line $e, h$ and because of the tension or pull on the material, the point of contact of the material with the roll 18 will approach the small end of the roll thereby causing a progressive movement of the material toward the small end of the roll 18 thus reducing the speed of the material and tending to again cause slack therein. Substantial equilibrium is then established although the material will continue to a slight extent to "hunt" back and forth along the upper roll 18.

The tendency for the material to travel toward the right on the lower roll 19 is greater when the axis of this roll is inclined than when it is substantially horizontal and, therefore, more tension is created in reaching an equilibrium position when the roll is horizontal than when inclined. Thus, the amount of tension desired for the material being processed may be controlled by the inclination of the axis of roll 19.

As shown in Fig. 1, if the material shrinks as it passes through the washer, it will find locations on the tapered rolls successively nearer the small ends of the rolls to compensate for the shrinkage. Means is provided at the entering end of the tank to guide the material to a selected portion of the first tapered roll so as to determine the rate of feed of the material into the washer. If it is found that the material has a tendency to run off the small end of the rolls, the entering speed may be increased by shifting the material towards the large end of the first roll. On the other hand, if there is stretching in the material as it passes through the tank and the material has a tendency to pass off the large ends of the rolls, the material is simply shifted towards the smaller end of the first tapered roll. A suitable mechanism for effecting the above-described adjustment of the entering speed of the material is disclosed in Figs. 1 and 2, and comprises a pair of upstanding guide fingers 11 mounted for movement transversely of the tank on an elongated rotary screw member 12 and a fixed slide rod 13. Thus, by rotating the screw member 12, it is possible to adjust the rate of the material entering the tank. If it is desired to provide for further adjustment of the speed of the material beyond the range afforded by the simple adjustment of the guide fingers 11, a variable speed transmission may be provided in the drive mechanism 21, for example, as shown at 22 in Fig. 1.

To afford the angular adjustment of the shaft 23 described above, the left hand end of the shaft is pivotally mounted in the tank 14 as indicated at 25 and the right hand end is mounted for vertical adjustment between opposed guide plates 26. Vertical adjustment of the right hand end is effected manually by an adjusting rod 27 which is pivotally secured to the shaft 23 at its lower extremity and is formed with a handle 28 at its upper extremity. Means is provided at 29 to lock the rod in adjusted position. Thus, by simply adjusting the handle 28, it is possible to regulate the tension in the strand material M. This feature of the invention is especially desirable in plants where the equipment is employed to handle a wide variety of materials which must be handled under widely different degrees of tension. When handling heavy materials which require heavy tension, the shaft 23 is adjusted to its lower limit position, and when handling fragile materials which require light tension, the shaft 23 is adjusted to its upper limit position.

The present invention permits the use of the squeeze rolls 17 and 18 to positively feed the material. In the present instance, a light squeeze is provided on the material by the weight of the upper squeeze roll 17 bearing on the lower roll 18. To this end, the roll 17 is free for vertical movement into engagement with the roll 18. The roll 17 is journalled for rotation on a square shaft 31 by means of bushings 32, 32. The shaft is held against lateral displacement between vertical guide plates 33, 33 and 34, 34 mounted respectively on the right and left hand walls of the tank. To prevent axial displacement of the shaft 31, a pin 35 secured in the left hand end of the shaft is slidably engaged in registering vertical slots 36 in the guide plates 34. Thus, the roll 17 is free to bear upon the roll 18 to provide a nip 37 for squeezing the excess liquid from the strand material M.

A suitable bias may be applied to the upper roll 17 to insure sufficient squeeze along the nip 37 of the upper and lower squeeze rolls 17 and 18 respectively. This may be accomplished, for example, as shown in Fig. 5 by a spring bias comprising a lower cup 40 pivotally secured to the shaft 31 at each of the opposite ends thereof and a second cup 41 fixedly mounted to the wall of the tank 14 by means of a bracket 42. The cups 40 and 41 are in vertical registry and compress between them a compression spring 43. Thus, the springs 43, 43 bias the upper roll 17 downwardly against the lower roll 18 with a predetermined spring force. Of course, a pneumatic bias may be supplied if desired.

Fig. 6 illustrates another tembodiment of the invention wherein each pair of squeeze rolls 17 and 18 is replaced by a single tapered driven roll 45. It is noted that the rotary axis of the roll 45 is horizontal and suitable drive means is indicated at 46. The operation of this embodiment of the invention is substantially the same as in the previous embodiments with the exception that there is no squeeze applied to the material as it is looped over the roll 45. This roll provides compensation for the shrinkage and stretching of the material as it passes through the bath in the same manner as described above in connection with Figs. 1 to 4. The material which is looped over the roll 45 automatically finds a location on the roll which provides a handling speed in accordance with the rate of travel of the material through the tank compensating for shrinkage and stretching. As in the previous embodiment, the degree of tension may be regulated by adjusting the bottom restraining member to the desired angle.

Figs. 7 and 8 disclose a further embodiment of the invention wherein the upper squeeze rolls are replaced by a slatted roll 48. The roll 48 comprises end plates 49 and 50 which are interconnected about their peripheries by a plurality of slats 51. The end plate 49 is of greater diameter than the end plate 50 so that the generated surface of the slats 51 constitutes a tapered roll surface. As in the previous embodiments, this roll is positively driven at a constant speed and compensates for shrinkage or stretching of the material. The slatted roll shown in these figures is especially suitable for handling materials in a dyeing process wherein it is desirable to minimize the contact between the material and the handling rolls.

It is not necessary that the nip 37 be horizontal when employing squeeze rolls as disclosed in Figs. 1 to 4, but the invention is operable when the rolls are mounted at any given angle. As shown in Fig. 9, it is possible to mount rolls 53 and 54 which are similar to the rolls 17 and 18 so that the nip 55 is inclined downwardly toward the large end of the tapered roll. The material looped over the roll 53 finds a location thereon which handles the material at a speed which compensates for shrinkage or stretch in the material and provides the desired tension therein in accordance with the inclination of the restraining members at the bottom of the tank.

The invention does not require that the bottom restraining member be positively adjusted. For example, it is practical to have the bottom roll free to move angularly. This is illustrated in Fig. 10 wherein the bottom roll 56 is mounted for rotation on a shaft 57. The shaft is pivotally mounted at one end 58 and is free for vertical movement at the other end between guide plates 59. A foot member 60 is secured to the free end of the shaft 57 to prevent the roll 56 from bearing against the bottom of the tank. In this embodiment of the invention, the tension in the material is dependent primarily upon the weight of the bottom roll, and the handling apparatus compensates for shrinkage and stretch of the material to maintain this tension relatively constant.

Fig. 11 illustrates another form of bottom restraining member which constitutes a tapered roll 66 which is rotatably mounted in the tank at a fixed inclination relative to the axis of rotation of the upper driven rolls.

In this embodiment of the invention, the handling apparatus compensates for shrinkage and stretching and maintains the tension in the material within the desired limits.

It is not necessary that the bottom roll be rotatably mounted, especially when the tension is regulated to a relatively low level. In this event, the bottom guide member need not be a roll as described above, but may constitute a simple bar or the like as indicated at 61 in Fig. 12. In the present instance, the bar is provided with a flange 62 adjacent each end thereof which prevents the material from running off the end of the bar and into its supports 63, thus eliminating the need for the lower limit rods 38.

It has not been attempted to exhaust the many forms and combinations of elements which may be employed within the purview of the present invention, and while particular embodiments of the invention have been herein illustrated and described, it is not intended to limit the invention to such disclosures, and changes and modifications may be made therein and thereto within the scope of the following claims.

I claim:

1. Apparatus for handling continuous lengths of material in strand, rope and like form, comprising a tapered roll mounted for rotation about a fixed axis substantially normal to the direction of travel of the material, means to feed said material to said roll affording free lateral movement of the material along the roll, an elongated restraining member disposed in spaced relation to said tapered roll substantially normal to the direction of travel of the material and engageable thereby, and drive means for said tapered roll operable to rotate the same at a predetermined speed to advance the material at a rate determined by the radius of the roll at the point of engagement thereof by said material and to create a force urging longitudinal movement of the material towards the large end of said roll to tension the material, the tension in the material creating a counteracting force urging longitudinal movement thereof towards the small end of said roll, and the point of engagement of the roll by the material being determined automatically by the counterbalance of the forces created by the rotation of said roll and the tension in the material.

2. Apparatus according to claim 1 wherein said restraining member comprises a cylindrical roll mounted for rotation about an axis generally transverse the direction of travel of the material.

3. Apparatus according to claim 1 wherein said restraining member comprises a tapered roll mounted for rotation about an axis generally transverse the direction of travel of the material and tapered in the same direction as said first-mentioned tapered roll.

4. Apparatus according to claim 1 wherein said restraining member comprises a rod mounted generally transverse the direction of travel of the material.

5. Apparatus according to claim 1 wherein said tapered roll comprises a pair of spaced radial end plates and a plurality of axial slats spanning between said end plates adjacent their outer peripheries, one of said end plates being of smaller diameter than the other, and said slats forming the tapered roll surface.

6. Apparatus for handling continuous lengths of material in strand, rope and like form, comprising a tapered roll mounted for rotation about a fixed axis substantially normal to the direction of travel of the material, a squeeze roll mounted adjacent said tapered roll and contacting the same along its length, means to feed said material to said roll affording free lateral movement of the material along the roll, an elongated restraining member disposed in spaced relation to said tapered roll substantially normal to the direction of travel of the material and engageable thereby, and drive means for said tapered roll operable to rotate the same at a predetermined speed to advance the material at a rate determined by the radius of the roll at the point of engagement thereof by said material, the point of engagement by said material being determined automatically by the tension in the material between the roll and the restraining member.

7. Apparatus according to claim 6 including means to bias said squeeze roll into pressure engagement with said tapered roll.

8. Apparatus for handling continuous lengths of material in strand, rope and like form, comprising a tapered roll mounted for rotation about a fixed axis substantially normal to the direction of travel of the material, means to feed said material to said roll affording free lateral movement of the material along the roll, an elongated restraining member disposed in spaced relation to said tapered roll substantially normal to the direction of travel of the material and engageable thereby, means to incline said restraining member upwardly in the direction of taper of said tapered roll, and drive means for said tapered roll operable to rotate the same at a predetermined speed to advance the material at a rate determined by the radius of the roll at the point of engagement thereof by said material, the point of engagement by said material being determined automatically by the tension in the material between said restraining members.

9. Apparatus according to claim 8 wherein the means to incline said restraining member comprises a pivotal mounting for said restraining member adjacent one end thereof and means at the other end affording vertical movement thereof.

10. Apparatus according to claim 9 including means for positioning said other end of the restraining member vertically relative to said pivoted end.

11. Apparatus for handling continuous lengths of material in strand, rope and like form comprising a tapered roll mounted for rotation about a fixed axis substantially normal to the direction of travel of the material, elongated restraining members disposed in spaced relation at opposite sides of said tapered roll substantially normal to the direction of travel of the material and engageable thereby, means to feed the material to one of said members affording free lateral movement of the material along the length of said one member, and drive means for said tapered roll operable to rotate the same at a predetermined speed to advance the material at a rate determined by the radius of the roll at point of engagement of the roll member by the material being determined automatically by the tension in the material between said restraining members.

12. Apparatus for handling continuous lengths of material in strand, rope and like form comprising a series of tapered rolls tapering in the same direction and mounted for rotation about fixed aligned axes substantially normal to the direction of travel of the material, means to feed the material to the first roll of said series affording free lateral movement of the material along the length of the rolls of said series, a series of elongated restraining members each disposed below and intermediate a pair of adjacent tapered rolls in spaced relation thereto substantially normal to the direction of travel of the material and engageable thereby, and drive means for said tapered roll operable to rotate the same at a predetermined speed to advance the material at a rate determined by the radius of the rolls at the points of engagement thereof by said material, the points of engagement by said material being determined automatically by the tension in the material between the restraining members of said series.

13. Apparatus for handling continuous lengths of material in strand, rope and like form, comprising a series of tapered rolls tapering in the same direction and mounted for rotation about fixed aligned axes substantially normal to the direction of travel of the material, a like number of squeeze rolls mounted adjacent said tapered rolls, each contacting one of said tapered rolls along its length, means to feed the material to the first roll of said series affording free lateral movement of the material along the length of the rolls of said series, a series of elongated restraining members each disposed below and intermediate a pair of adjacent parallel tapered rolls in spaced relation thereto substantially normal to the direction of travel of the material and engageable thereby, means to incline said restraining members upwardly in the direction of taper of said tapered rolls, and drive means for said rolls operable to rotate the same at a predetermined speed to advance the material at a rate determined by the radius of the rolls at the points of engagement thereof by said material, the point of engagement by said material being determined automatically by the tension in the material between the roll and the restraining member.

References Cited in the file of this patent

UNITED STATES PATENTS

| 2,158,547 | Lawson | May 16, 1939 |
| 2,333,278 | Truesdail | Nov. 2, 1943 |

FOREIGN PATENTS

| 858,002 | Germany | Dec. 4, 1952 |